United States Patent
Tai et al.

(10) Patent No.: US 8,149,556 B2
(45) Date of Patent: Apr. 3, 2012

(54) POWER ADAPTER AND POWER SUPPLY METHOD THEREOF

(75) Inventors: Fang-Ta Tai, Taipei Hsien (TW); Chen-Hsiang Lin, Taipei Hsien (TW); Li-Chung Sun, Taipei Hsien (TW); Teng-Feng Zou, Taipei Hsien (TW); Jui-Ting Hung, Taipei Hsien (TW); Yi-Bin Hwang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 375 days.

(21) Appl. No.: 12/479,864

(22) Filed: Jun. 8, 2009

(65) Prior Publication Data

US 2010/0284206 A1 Nov. 11, 2010

(30) Foreign Application Priority Data

May 6, 2009 (CN) .......................... 2009 1 0302117

(51) Int. Cl.
*H01H 47/00* (2006.01)

(52) U.S. Cl. .......................... 361/139; 307/140; 307/143

(58) Field of Classification Search .................... 307/80, 307/82, 130, 132 R, 132 E, 139, 140, 143; 361/160, 170, 206
See application file for complete search history.

(56) References Cited

U.S. PATENT DOCUMENTS

| | | | | |
|---|---|---|---|---|
| 4,350,337 A * | 9/1982 | Knauer et al. | ................... | 473/66 |
| 5,812,386 A * | 9/1998 | Youn | ................... | 363/86 |
| 6,272,030 B1 * | 8/2001 | Oomura | ................... | 363/62 |
| 6,345,364 B1 * | 2/2002 | Lee | ................... | 713/324 |
| 6,995,807 B2 * | 2/2006 | Libera | ................... | 348/730 |
| 7,315,097 B2 * | 1/2008 | Tajika | ................... | 307/131 |
| 7,388,305 B2 * | 6/2008 | McCoy et al. | ................... | 307/130 |
| 7,446,437 B2 * | 11/2008 | Paik et al. | ................... | 307/115 |
| 7,523,328 B2 * | 4/2009 | Seo | ................... | 713/320 |
| 7,586,548 B2 * | 9/2009 | Libera | ................... | 348/730 |
| 7,774,633 B1 * | 8/2010 | Harrenstien et al. | ................... | 713/323 |
| 7,804,311 B2 * | 9/2010 | Irie et al. | ................... | 324/714 |
| 7,864,499 B2 * | 1/2011 | Hung et al. | ................... | 361/139 |
| 8,013,581 B2 * | 9/2011 | Lin | ................... | 323/272 |

* cited by examiner

*Primary Examiner* — Gary L Laxton
(74) *Attorney, Agent, or Firm* — Altis Law Group, Inc.

(57) ABSTRACT

A power adapter for an electronic device selectively works in different modes according to a working state signal of the electronic device. When the electronic device is powered off or on with a battery in a determined charge state, the power adapter controls a relay to turn off the relay to disconnect power to the electronic device.

7 Claims, 3 Drawing Sheets

POWER ADAPTER AND POWER SUPPLY METHOD THEREOF

BACKGROUND

1. Technical Field

The present disclosure relates to power adapters and power supply methods, and particularly to a power adapter of a electronic device and a power supply method of the power adapter.

2. Description of Related Art

As long as a power adapter is connected to an electronic device, such as a notebook computer, the power adapter will continue to supply a working voltage to the electronic device, even if the electronic device is powered off or working off the battery. Therefore, power is wasted.

DETAILED DESCRIPTION

Figure 1:
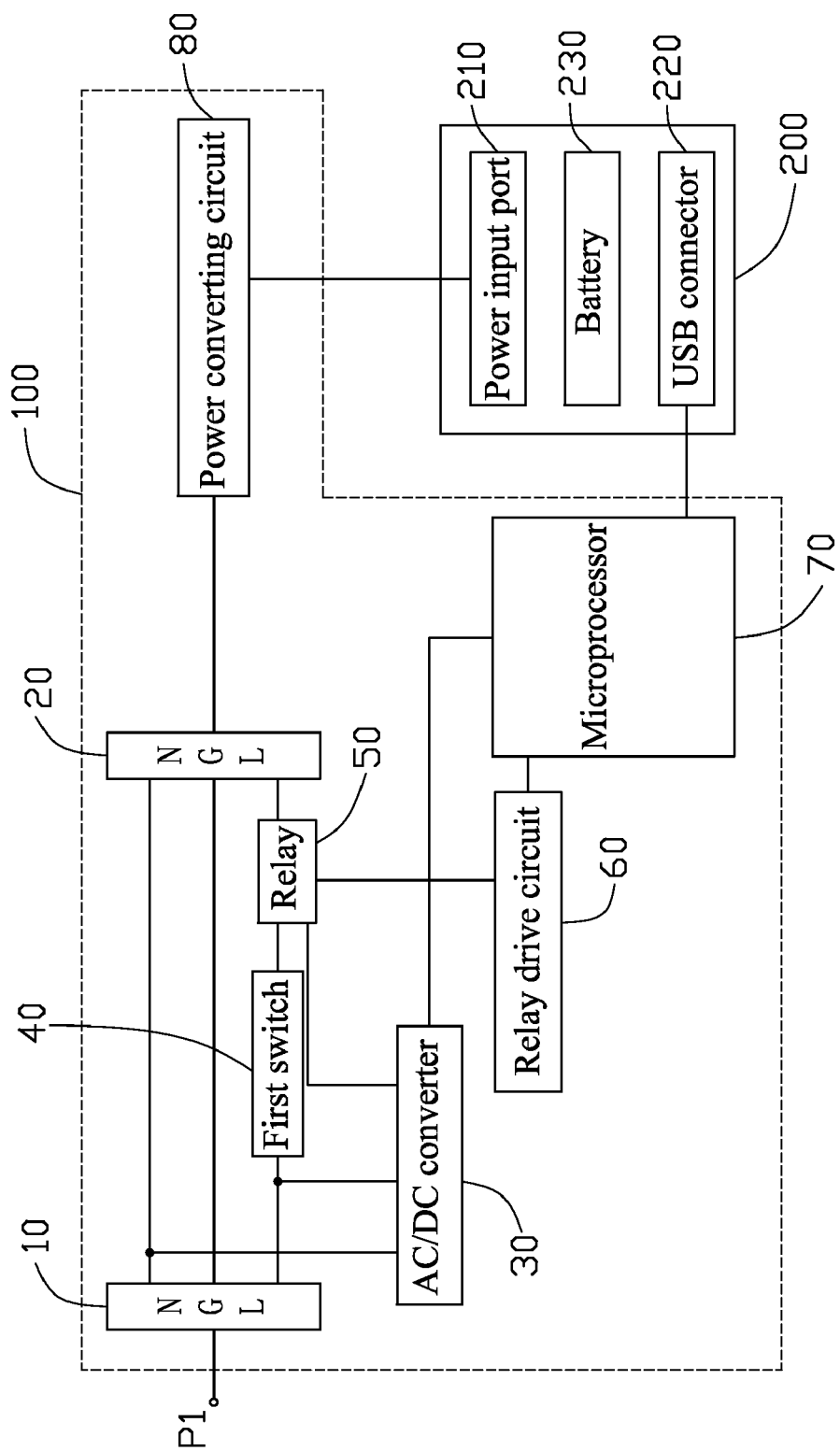
FIG. 1 is a block diagram of an exemplary embodiment of a power adapter connected to an electronic device.

Referring to FIG. 1, an exemplary embodiment of a power adapter 100 is applied to an electronic device 200. The power adapter 100 includes a power input interface 10, a power output interface 20, an alternating current/direct current (AC/DC) converter 30, a first switch 40, a relay 50, a relay drive circuit 60, a microprocessor 70, and a power converting circuit 80. The electronic device 200 includes a power input port 210, a universal serial bus (USB) connector 220, and a battery 230. In one embodiment, the electronic device may be a notebook computer, for example.

Figure 2:
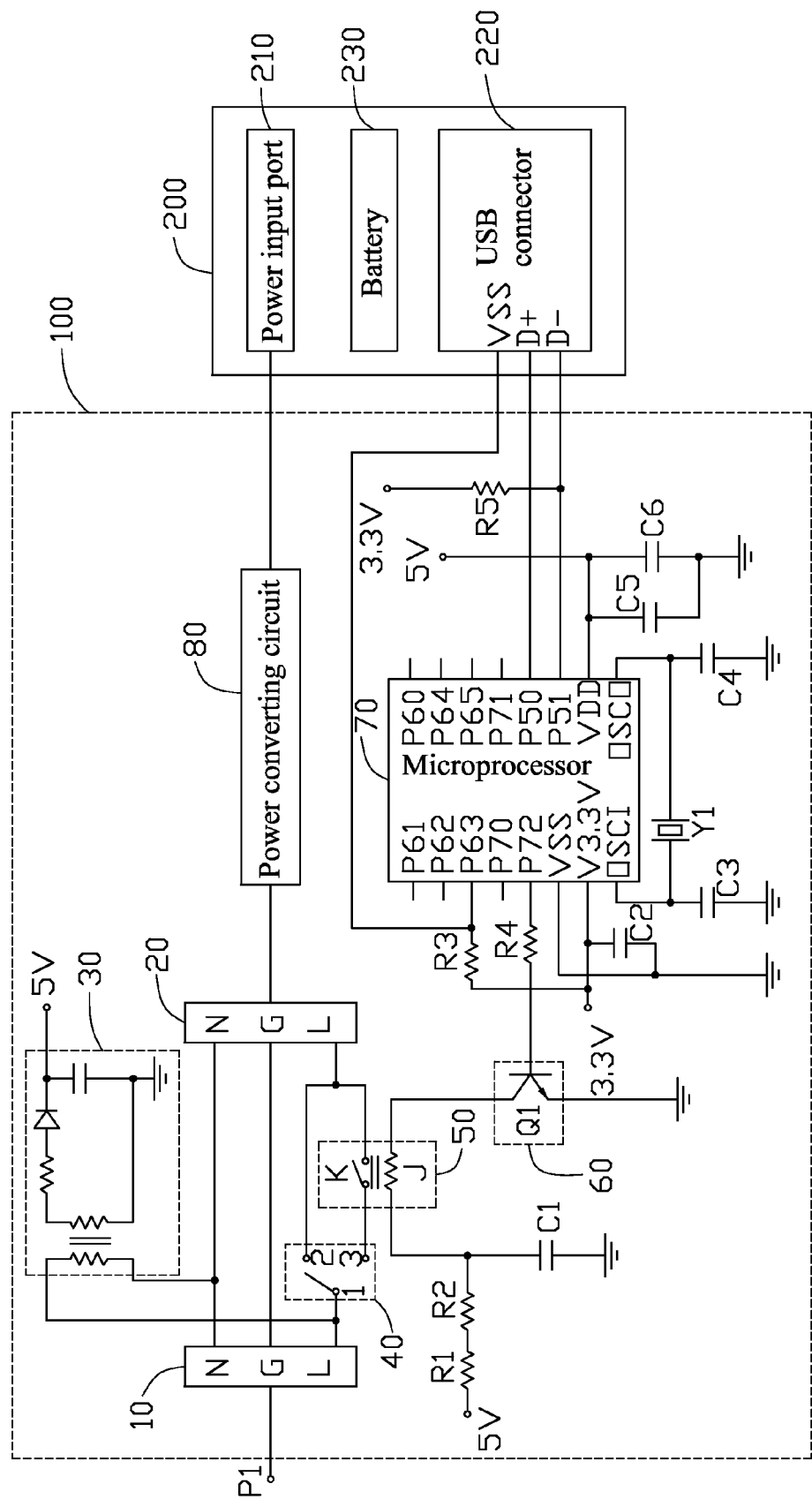
FIG. 2 is one embodiment of a circuit diagram of the power adapter and the electronic device of FIG. 1.

Referring to FIG. 2, the power input interface 10 is connected to an alternating current (AC) power supply P1, such as a 120V, to receive an AC voltage signal, and transmit the AC voltage signal to the power converting circuit 80 via the first switch 40, the relay 50, and the power output interface 20.

The AC/DC converter 30 receives the AC voltage signal from the AC power supply P1 via the power input interface 10, and converts the AC voltage signal into a 5V first direct current (DC) voltage signal, for the relay 50 and the microprocessor 70.

The first switch 40 is a single-pole-double-throw (SPDT) switch including a pole 1, a first throw 2, and a second throw 3. The pole 1 is connected to the power input interface 10 to receive the AC voltage signal. The first throw 2 is connected to the power output interface 20. The second throw 3 is connected to the power output interface 20 via the relay 50. The power adapter 100 works in a common mode when the pole 1 is connected to the first throw 2, in which the AC voltage signal from the AC power supply P1 is provided for the power converting circuit 80 directly via the power output interface 20. The power adapter 100 works in an energy saving mode when the pole 1 is connected to the second throw 3, in which the AC voltage signal from the AC power supply P1 is provided for the power converting circuit 80 via the relay 50 and the power output interface 20.

The relay 50 includes a second switch K and a coil J. The second switch K is connected between the second throw 3 of the first switch 40 and the power output interface 20. A first end of the coil J is connected to the AC/DC converter 30, to receive the 5V first DC voltage signal via two resistors R1 and R2 in series, and is also grounded via a capacitor C1. A second end of the coil J is connected to the relay drive circuit 60, to receive a first or a second drive signal from the relay drive circuit to drive the second switch K of the relay 50.

The relay drive circuit 60 includes a transistor Q1. The collector of the transistor Q1 is connected to the second coil J of the relay 50, to output the first or the second drive signal to the relay 50. In this embodiment, the first drive signal is a low level signal of about 0 volts and the second drive signal is a high level signal of about 5 volts. The emitter of the transistor Q1 is grounded. The base of the transistor Q1 is connected to the microprocessor 70, to receive a first or a second control signal from the microprocessor 70. In this embodiment the first control signal is a high level signal of about 3.3 volts and the second control signal is a low level signal of about 0 volts. In another exemplary embodiment, the relay drive circuit 60 can be replaced by another kind of drive circuit, such as a metallic oxide semiconductor field effect transistor (MOSFET), a transistor combination circuit, a MOSFET combination circuit, a transistor-MOSFET combination circuit, and so on.

In one exemplary embedment, the microprocessor 70 may be a EM78612A type chip. A pin P63 of the microprocessor 70 is connected to a pin VSS of the USB connector 220 of the electronic device 200, and also connected to a pin V3.3V of the microprocessor 70. A pin P72 of the microprocessor 70 is connected to the base of the transistor Q1 via a resistor R4. A pin VSS of the microprocessor 70 is grounded, and connected to the pin V3.3V of the microprocessor 70 via a capacitor C2. The pin V3.3V is to output a 3.3V signal. Pins OSCI and OSCO of the microprocessor 70 are interconnected via a crystal Y1, and both grounded respectively via capacitors C3 and C4. A pin VDD of the microprocessor 70 is grounded via parallel capacitors C5 and C6, and connected to the AC/DC converter 30 to receive the first DC voltage signal. Pins P50 and P51 are correspondingly connected to pins D+ and D− of the USB connector 220 of the electronic device 220. Other pins P61, P62, P70, P71, P65, P64, and P60 are all null, in one embodiment.

The power converting circuit 80 is connected between the power output interface 20 and the power input port 210 of the electronic device 200, to convert the AC voltage signal output from the power output interface 20 into a second DC voltage signal for the electronic device 200. The second DC voltage signal may be 19V, in one example.

When the power input interface 10 is connected to the AC power supply P1, and at the same time, the pole 1 of the first switch 40 is connected to the second throw 3 to make the electronic device 200 work in the energy saving mode. In the energy saving mode, the AC/DC converter 30 converts the AC voltage signal into the 5V first DC voltage signal for powering the microprocessor 70. The pin P72 of the microprocessor 70 outputs the first control signal to turn on the transistor Q1. The transistor Q1 outputs the first drive signal to close the second switch K, thereby the AC power supply P1 is connected to the power converting circuit 80 via the first switch 40, the relay 50, and the power output interface 20, and the AC voltage signal is converted into the 19V second DC voltage signal for the electronic device 200.

If the electronic device is powered off or on but using the battery 230 and the battery 230 is more than 80% charged, the electronic device 200 outputs a first computer state signal via the USB connector 220 to the microprocessor 70. The pin P72 of the microprocessor 70 outputs the second control signal to turn off the transistor Q1. The transistor Q1 outputs the second drive signal to open the second switch K of the relay 50. Therefore, the AC power supply P1 is disconnected from the power converting circuit 80. The power adapter 100 will not provide the 19V second DC voltage signal to the electronic device 200 anymore.

In one exemplary embodiment, when the electronic device is on and using the battery 230 more than 80% charged, the microcomputer 70 is set to alternately output the first control signal for 5 minutes and the second control signal for 55 minutes, repeatedly. Therefore, the battery 230 can be charged for 5 minutes every hour to avoid discharging the battery 230 completely. It may be understood that these times are exemplary and may vary depending on the embodiment.

However, if the electronic device 200 is on without using the battery 230 or on but using the battery 230 which is not more than 80% charged, the electronic device 200 outputs a second computer state signal for the microprocessor 70 via the USB connector 220. The pin P72 of the microprocessor 70 still outputs the first control signal to turn on the transistor Q1. The transistor Q1 still outputs the first drive signal to close the second switch K of the relay 50. Therefore, the AC voltage signal from the AC power supply P1 is still provided for the power converting circuit 80, to be converted into the 19V second DC voltage signal for the electronic device 200.

In an other exemplary embodiment, the electronic device 200 may output the first or second computer state signal according to the battery 230 with another determined charge state, such as 60% charged and 90% charged, not limited with 80% charged.

Figure 3:
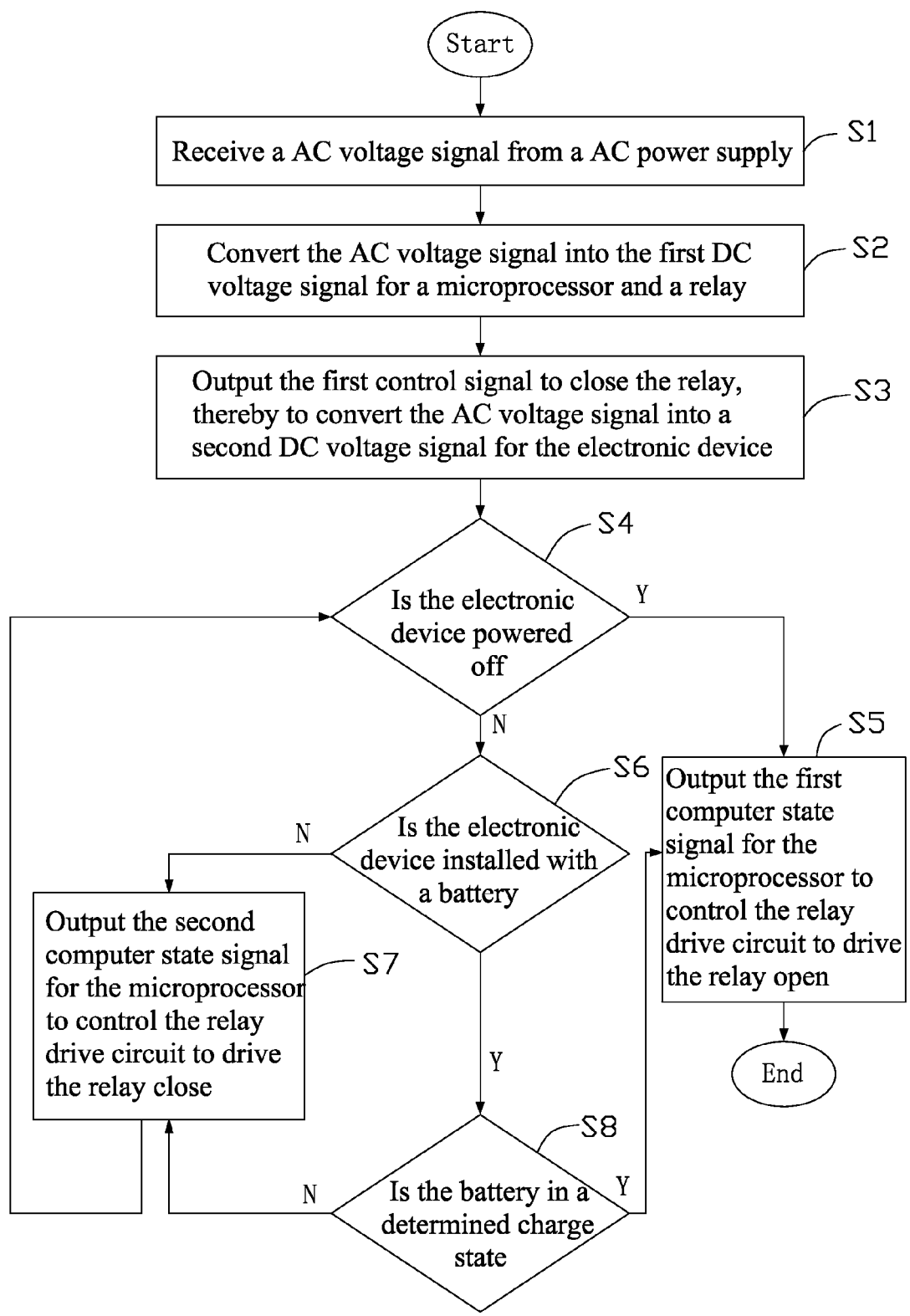
FIG. 3 is a flowchart of an exemplary embodiment of a power supply method of the power adapter of FIG. 1.

Referring to FIG. 3, a power supply method of the power adapter 100 of the electronic device 200 includes the following steps.

In step S1, the power input interface 10 receives an AC voltage signal from the AC power supply P1.

In step S2, the AC/DC converter 30 converts the AC voltage signal into the 5V first DC voltage signal supplied for the microprocessor 70 and the relay 50.

In step S3, the microprocessor 70 outputs the first control signal to turn on the relay drive circuit 60, and the relay drive circuit 60 outputs the first drive signal to close the relay 50, thereby the power converting circuit 80 converts the AC voltage signal into the 19V second DC voltage signal for the electronic device 200.

In step S4, a determination is made whether the electronic device 200 is powered off. If the electronic device 200 is powered off, the flow goes to step S5. If the electronic device is not powered off, the flow goes to step S6.

In step S5, the electronic device 200 outputs the first computer state signal for the microprocessor 70, and the microprocessor 70 outputs the second control signal to make the relay drive circuit 60 output the second drive control signal to open the second switch K of the relay 50.

In step S6, a determination is made whether the electronic device 200 is installed with the battery 230 or not. If the electronic device 200 is not installed with the battery 230, the flow goes to step 7. If the electronic device 200 is installed with the battery 230, the flow goes to step S8.

In step S7, the electronic device 200 outputs the second computer state signal for the microprocessor 70, and the microprocessor 70 still outputs the first control signal to make the relay drive circuit 60 still output the first drive control signal to close the second switch K of the relay 50.

In step S8, a determination is made whether the battery 230 is more than 80% charged or not. If the battery 230 is not more than 80%, the flow returns to step S7. If the battery 230 is more than 80%, the flow returns to step S5.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power adapter for an electronic device, comprising:
a power interface to receive an alternating current (AC) voltage signal from a power source and output the AC voltage signal;
an alternating current to direct current (AC/DC) converter to receive the AC voltage signal and convert the AC voltage signal into a first direct current (DC) voltage signal;
a power converting circuit to receive the AC voltage signal from the power interface and convert the AC voltage signal into a second DC voltage signal for the electronic device;
a microprocessor to receive the first DC voltage signal from the AC/DC converter and to be connected to the electronic device to receive a computer state signal from the electronic device in response to the electronic device being powered off or working with a battery in a determined charge state, and output a control signal according to the computer state signal; and
a relay connected between the power interface and the power converting circuit, and connected to the microprocessor, wherein the microprocessor outputs the control signal to drive the relay to disconnect the power interface from power converting circuit, wherein the power adapter further comprises a switch connected between the power interface and the power converting circuit via the relay, the switch is a single-pole-double-throw switch comprising a pole connected to the power interface to receive the AC voltage signal, a first throw directly connected to power converting circuit, and a second throw indirectly connected to power converting circuit via the relay.

2. The power adapter of claim 1, further comprising a relay drive circuit connected between the microprocessor and the relay, the microprocessor outputs a control signal according to the computer state signal, the relay drive circuit receives the control signal from the microprocessor and outputs a drive signal to the relay to drive the relay to disconnect the power interface from the power converting circuit.

3. The power adapter of claim 2, wherein the relay drive circuit comprises a transistor;
the base of the transistor is connected to the microprocessor to receive the control signal, the emitter of the transistor is grounded, and the collector of the transistor is connected to the relay to output the drive signal.

4. A power supply method for a power adapter of an electronic device, comprising:
receiving an alternating current (AC) voltage signal from an AC power supply via a power interface of the electronic device;
converting the AC voltage signal into a first direct current (DC) voltage signal for a microprocessor and a relay of the electronic device;
converting the AC voltage signal into a second DC voltage signal by a power converting circuit of the electronic device via the relay, for the electronic device;

determining whether the electronic device is powered off;
outputting a computer state signal by the electronic device for the microprocessor in response that the electronic device is powered off;
outputting a control signal by the microprocessor; and
outputting a drive signal to open the relay to disconnect the power interface from the power converting circuit;
determining whether the electronic device is installed with a battery in response to that the electronic device is not powered off; and
returning to the step of converting the AC voltage signal into a second DC voltage signal by a power converting circuit via the relay, in response to that the electronic device is not installed with the battery.

5. The method of claim 4, further comprising:
determining whether the battery is in a determined charge stage in response that the electronic device is installed with the battery; and
returning to the step of outputting a drive signal to open the relay to disconnected the power interface from the power converting circuit.

6. The method of claim 5, wherein the drive signal is outputted by a relay drive circuit.

7. The method of claim 6, wherein the relay drive circuit comprises a transistor; the base of the transistor is connected to microprocessor to receive the control signal, the emitter of the transistor is grounded, and the collector of the transistor is connected to the relay to output the drive signal.

* * * * *